July 4, 1967

A. S. PARKS 3,329,393

SELF-LOCKING POSITIONING DEVICE
FOR ROTATABLE SHAFT

Filed Sept. 8, 1964

INVENTOR
ASBURY S. PARKS

BY *Head & Johnson*

ATTORNEYS

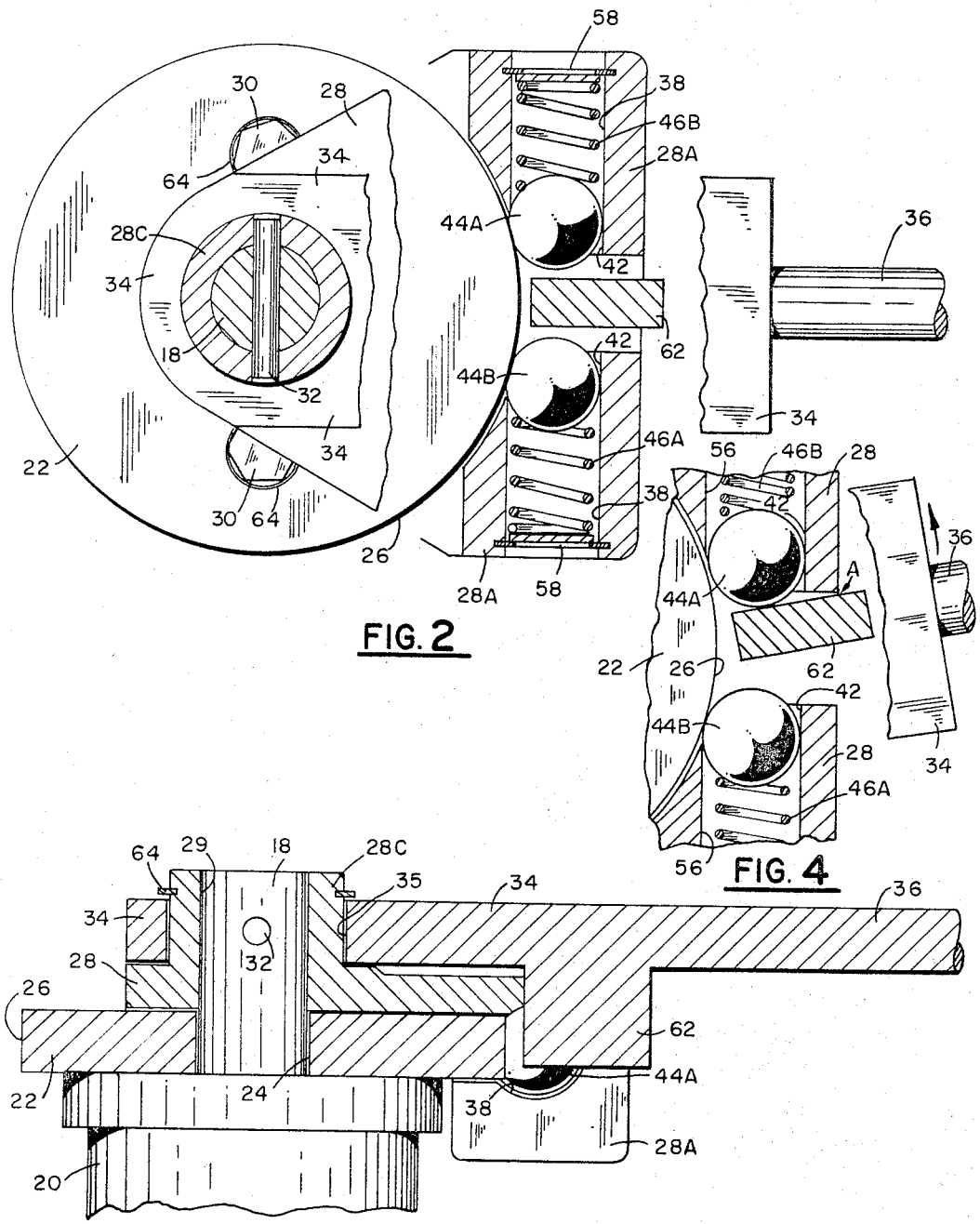

United States Patent Office 3,329,393
Patented July 4, 1967

3,329,393
SELF-LOCKING POSITIONING DEVICE FOR
ROTATABLE SHAFT
Asbury S. Parks, Houston, Tex., assignor to Dover Corporation, W. C. Norris Division, Tulsa, Okla., a corporation of Delaware
Filed Sept. 8, 1964, Ser. No. 394,913
7 Claims. (Cl. 251—78)

This invention relates to a self-locking positioning device. More particularly, this invention relates to a device including means whereby a shaft may be rotationally positioned, and whereby, when positioning force is released, the shaft is firmly retained in the set position. In one application, the invention relates to a self-locking positioning device to control the positioning of the closure member of a valve whereby the closure member may be readily rotated from one position to another and whereby the closure member is always locked in position except when it is being moved from one position to another.

In a more limited sense, the invention relates to a self-locking positioning device including means whereby a shaft may be rotationally positioned by means of a readily removable uniquely shaped handle member wherein, with the handle member removed, the shaft is locked in position and such shaft position is substantially tamper-proof.

This invention will be described as it is particularly adapted for use to position the closure member of a valve, such as a butterfly valve. It is understood that the exemplification of one application of the invention is for illustrative purposes only and that the invention is in no wise limited to such exemplified application but broadly relates to a self-locking mechanism adaptable to lock in positions a rotatable shaft of any type device or machine.

It is an object of this invention to provide a self-locking positioning device.

A more specific object of this invention is to provide a self-locking positioning device adaptable to lock a shaft in a rotational position.

Another object of this invention is to provide a self-locking positioning device for a rotatable shaft, the device being so arranged that by rotational force on a handle member the shaft is rotated from one position to another, and further including means whereby as rotational force is relieved from the handle member the shaft is automatically locked in position.

When this invention is applied to control the closure member of a butterfly valve, or the like, an important object is to provide greatly increased safety to the personnel operating such valves. When larger size butterfly valves are utilized to control the flow of liquids or gases, it has been found that flow through the valve creates a considerable amount of torque on the closure member. With known types of locking devices utilized to lock the closure members in preset positions the closure member is free to rotate as soon as the locking force is released. Thus, if a handle is utilized to manually position a larger size butterfly valve, the sudden torque applied to the closure member by fluid flow through the valve can cause the handle to suddenly rotate, endangering the person attempting to reposition the valve. By the self-locking device of this invention, the torque applied to the closure member cannot rotate the closure member in advance of the rotation of the handle.

In like manner, when a mechanical, electrical, hydraulic, pneumatic, or some similar means is used to position the closure member of a larger size butterfly valve, the application of the principles of this invention prevents the sudden application of force on the positioning equipment by the effect of torque applied to the closure member as a result of fluid flow through the valve. It is therefore an object of this invention to provide a self-locking positioning device for a rotatable shaft characterized by means whereby the rotatable shaft cannot lead the rotation of the force applied to position the shaft.

Another object of this invention is the provision of a self-locking positioning device for a rotatable shaft including means whereby the shaft is rotatably manually positioned by means of a uniquely configured handle and further including means whereby the handle may be easily removed to prevent unauthorized personnel from repositioning the shaft and further to reduce the chance of vibration causing the shaft to be inadvertently repositioned.

Another object of this invention is to provide a self-locking device for positioning a rotatable shaft, the device characterized, in one embodiment, by two juxtaposed balls or rollers having locking engagement with one side of an exterior cylindrical surface whereby thrust in locking is applied to the shaft in only one direction.

Another object of this invention is to provide a self-locking positioning device including a fixed base member having an external cylindrical wedging surface and an axial opening having a rotatable shaft extending therethrough, the shaft having a locking member affixed thereto, and including two wedging members resiliently supported between the locking member and the external cylindrical surface of the base member, and including means of disengaging selectively one or the other of the wedging members so that the shaft may be rotated and, most particularly, in the preferred embodiment, including means whereby the locking member is positively engaged subsequent to the disengagement of one of the wedging members for positive rotation of the shaft.

These and other objects will be fully described and a better understanding of the invention will be had by referring to the following description and claims taken in conjunction with the attached drawings in which:

FIGURE 2 is a top view of the self-locking positioning device of this invention shown partially in cross-section. The valve of FIGURE 1 is not shown in FIGURE 2.

FIGURE 3 is an enlarged side view of the upper portion of FIGURE 1 shown partially in cross-section.

FIGURE 4 is a fragmentary view of that shown in FIGURE 2 showing the relation of elements of the device as the handle member is rotated.

This invention may be described as a self-locking positioning device. More particularly, but not by way of limitation, the invention may be described as a self-locking positioning device comprising a fixed base member having an external cylindrical wedging surface and having a small diameter axial opening therethrough, a shaft extending through the opening, the shaft extending coaxially of the external cylindrical wedging surface of the base, a locking member affixed to the shaft having at least two directionally opposed wedging surfaces in proximity to the external cylindrical wedging surface, a first and second wedge member positioned between the wedging surfaces of the locking member and the cylindrical wedging surface of the base member, a handle member rotatably supported about the shaft and adjacent the base member having a wedge engaging portion extending therefrom in close proximity to each of the wedge members, biasing means normally urging the wedging members into wedging engagement between the locking member and the external cylindrical wedging surface of the fixed base member, the wedge members disengageable when contacted by the wedge engaging portion of the handle member whereby one or the other of the wedge members is disengaged as the handle member is rotated to permit the rotation of the locking member in the same direction of rotation as the handle member, and means with the handle member positively engaging the locking member to rotate the locking member with the handle member, the means engaging the locking member subsequent to the engagement of the wedge engaging portion with one of the wedge members as the handle member is rotated.

Figure 1:
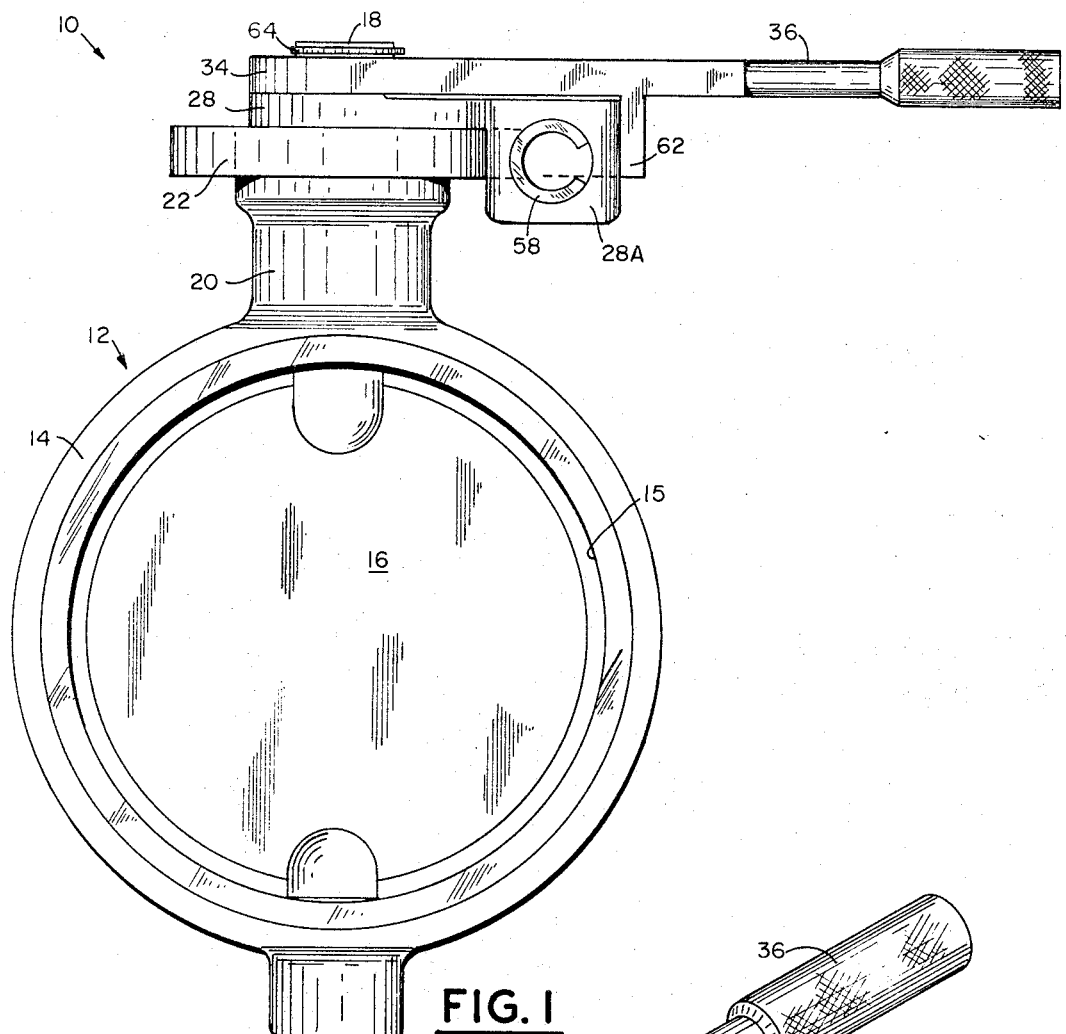
FIGURE 1 is an end view of a typical butterfly valve having the self-locking positioning device of this invention incorporated with the valve.

Referring now to the drawings and first to FIGURE 1, the self-locking positioning device is indicated generally by the numeral 10. For purposes of illustrating one application of the device, the self-locking positioning device 10 is shown as utilized with a butterfly valve, the valve being generally indicated by the numeral 12. The valve 12 consists essentially of a tubular body portion 14 having a fluid passage opening 15 therethrough. Rotatably supported in the fluid passage opening 15 is a closure member 16 having the form of a flat disc 16. FIGURE 1 shows the disc in fully closed position, the valve being shown in end view. Extending from the disc 16 and providing both a means to support and to rotate the disc is a shaft 18, only the upper end of which is seen in FIGURE 1. The shaft 18 extends through an integral boss portion 20 forming a part of the tubular body 14. In normal practice a handle is affixed directly to shaft 18. When it is desired to move the closure member 16 from open to closed position or to any intermediate position, the handle is utilized to rotate shaft 18. This invention provides a means whereby the shaft 18 is automatically locked in any position.

Supported to the upper surface of boss portion 20 is a fixed base member 22. The base member 22 has an axial small diameter opening 24 (see FIGURE 3) which rotatably receives shaft 18. The base member is further defined by an external cylindrical wedging surface 26.

Affixed to shaft 18 and adjacent the upper surface of the base member is a locking member 28. The locking member 28 has an integral upstanding tubular portion 28C having a shaft receiving opening 29 therein.

As shown in FIGURE 2, the base member 22 is supported to the upper end of the valve boss portion by means of bolts 30. It can be seen that an alternate arrangement would include the provision wherein the base member 22 is integrally formed with boss portion 20.

The locking member 28 is secured to shaft 18 such as by means of a pin 32 (see FIGURES 2 and 3).

Figure 5:
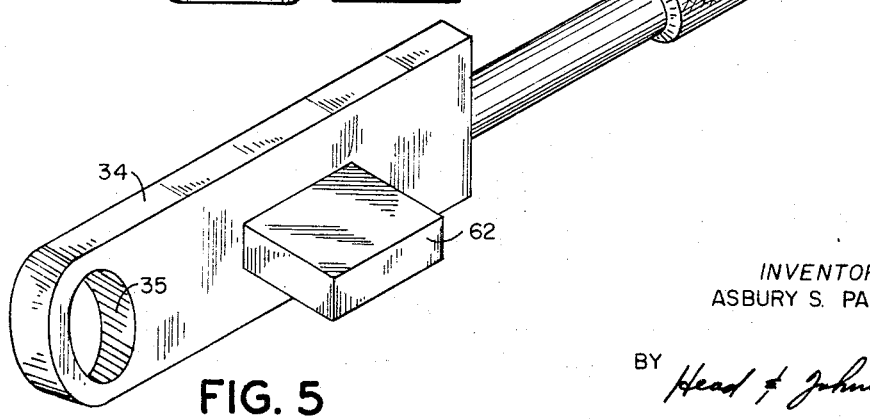
FIGURE 5 is an isometric view of the removable handle member of this invention.

Rotatably supported about the tubular portion 28C of the locking member is a handle member 34. The handle member has an opening 35 (see FIGURES 3 and 5) to receive the tubular portion 28C of the locking member. It can be seen that in the simplest embodiment the handle member 34 pivots about shaft 18. The handle member includes, as an exemplary embodiment of the invention, a hand engaging portion 36. The illustration of the invention for hand operation is for purposes of exemplification, however, it is to be understood that the invention is readily adaptable for operation by hydraulic, pneumatic, electrical or other torque supply means.

The locking member includes a portion 28A which lies adjacent to and exterior of the exterior cylindrical surface 26 of the base member 22. Formed in the portion 28A are opposed cylindrical openings 38. A portion of each of the cylindrical openings provides wedge engaging surfaces 42. Slidably positioned in openings 38 are wedge member 44A and 44B which are preferably, but not necessarily, spherical. Biasing means, such as springs 46A and 46B, urge the wedging members 44A and 44B into opposed wedging relationship with the wedging surfaces 42 of the locking member 28 and the external cylindrical wedging surface 26 of base member 22. Keepers 58 retain springs 46A and 46B within cylindrical openings 38.

Handle member 34 includes an integral downwardly extending wedge engaging portion 62, which is positioned between the wedging members 44A and 44B. The wedge engaging portion 62 is spaced from the handle opening 35 and extends substantially in a plane of the axis of openings 35.

*Operation*

The invention has been illustrated and the operation thereof will be described as it is adapted for use to position the closure member of a valve and further as it is adapted for manual operation, it being understood that the invention is broadly applicable to lockingly position a rotatable shaft for any purpose and that the repositioning of the shaft may be accomplished with rotational force applied by any means to the handle member.

Referring to FIGURES 1 and 2 the closure member 16 is in the closed position. Any force applied internally of the valve 14 to reposition closure member 16 applies torque to shaft 18 and thereby locking member 28. By the opposed wedging action of wedging members 44A and 44B against base member 22 the locking member 28 cannot rotate in either direction and therefore the valve closure member 16 is locked from rotation.

When it is desired to reposition the closure member 16 an operator applies manual force to hand engaging portion 36 of handle member 34. The effect is best illustrated in FIGURE 4. The rotational force of handle member 34 causes the wedge engaging portion 62 to engage and dislodge one of the wedging members, in this case, member 44A. With wedging member 44A dislodged, the locking member 28, and thereby shaft 18 and closure member 16, is free to rotate in the direction of rotation of the handle member 34.

A unique element of this invention is the provision that the rotational force applied through the handle member 34 to rotate the locking member 28, and thereby shaft 18, is not applied through the locking members 44. As seen in FIGURE 4, after the wedging member 44A has become disengaged, the further rotation of handle member 34 positively engages the locking member 28 at "A" so that rotational force is directly applied from the handle member 34 to the locking member 28, from thence to shaft 18 and any element affixed to the shaft, such as the valve closure member 16 illustrated.

As has been previously described, the manual operation of many devices, including large butterfly valves is dangerous in that the handle of such devices may be subject to violent and sudden rotation. This is particularly true in large butterfly valves. As the closure member 16 is moved from the open towards the closed position, the force of high velocity fluid through the valve can cause the closure member so suddenly rotate with great force. This invention precludes such rotational force applied to the valve closure member 16 from being transmitted to the handle 36. As best illustrated in FIGURES 2 and 4, it can be seen that if the locking member 28 rotates faster than the handle member 34, the wedging member 44A (or 44B if the handle member had been rotated in the opposite direction) will move back into wedging relationship, precluding the further rotation of the locking member relative to the base 22. Another means of expressing it is that the locking member 28 and shaft 18 cannot lead the rotation of handle member 34.

An important operational feature of this invention is the provision of means whereby the self-locking positioning device is easily made substantially "tamper-proof." FIGURES 1 and 3 show the handle member retained in position by a keeper 64. With keeper 64 deleted the handle member is expeditiously removed. It can be seen that, when handle member 34 is removed, the shaft 18 is locked in position by locking member 28.

To rotate locking member 28 requires simultaneously the application of rotational force plus some means of dislodging one of the wedging members 44A or 44B. In application, an operator may carry a single handle member 34, best illustrated in FIGURE 5, for use in conjunction with a number of the self-locking positioning devices of this invention.

An important additional advantage of the handle removing feature is the advantage accrued when the invention is utilized to position a rotatable shaft subject to vibration. With the handle member 34 removed, there is nothing to vibrate against the wedging members 44A and 44B to possibly cause dislodgment and resulting rotation of the shaft.

In summary, this invention provides a self-locking positioning device for rotatable shafts which is characterized by:

(A) Simplicity and economy of design and construction.

(B) Automatically locks a rotatable shaft in any position.

(C) Provides means whereby a rotatable shaft is easily rotated from one position to another by rotation of a handle member in the desired direction.

(D) Provides positive contact between the handle member and other elements of the device as the handle member is rotated so that rotational force is transmitted directly and not through wedging members.

(E) A removable handle member making the device substantially "tamper-proof" and substantially reducing the possibility of vibration effecting the positioning of the device.

Although this invention has been described with a certain degree of particularity it is manifest that many changes may be made in the details of construction and the arrangement of components without departing from the spirit and scope of this disclosure. The description and drawings are exemplary of the application of the invention and are not to be taken in a limited sense but the scope of the invention is to be ascertained from the following claims.

What is claimed:

1. A self-locking positioning device comprising, in combination:

a fixed base member having a cylindrical exterior wedging surface and having an axial opening therein;

a shaft extending through the axial opening of the fixed base member coaxially of the cylindrical wedging surface;

a locking member affixed to the shaft adjacent the fixed base member having a wedging surface in proximity to the cylindrical wedging surface of the fixed base member;

a first and second wedge member positioned between the wedging surface of the locking member and the cylindrical wedging surface of the fixed base member;

a handle member rotatably supported about the shaft and adjacent the base member and having a wedge engaging portion extending therefrom intermediate of and in close proximity to each of the wedge members;

biasing means normally urging the wedge members into wedging engagement between the locking member and the fixed base member, the wedge members disengageable when contacted by the wedge engaging portion of the handle member whereby one or the other of the wedge members is disengaged as the handle member is rotated to permit the rotation of the locking member, and thereby the shaft, in the same direction of rotation as the handle member; and means with the handle member positively engaging the locking member to rotate the locking member with the handle member, said means engaging the locking member subsequent to the engagement of the wedge engaging portions with one of the wedge members as the handle member is rotated.

2. A self-locking positioning device comprising, in combination:

a fixed base plate having a cylindrical exterior surface and an axial opening therethrough;

a shaft rotatably supported in said opening;

a locking member overlying the base plate and affixed to the shaft, at least a portion of the locking member lying adjacent to and exterior a portion of the cylindrical exterior surface of the base plate, this portion of the locking member having opposed wedge receiving openings therein;

a wedge member slidably positioned in each of the wedge receiving openings;

means biasing the wedge members into wedging engagement with the cylindrical exterior surface of the base plate; and a handle member rotatably supported about the shaft having a disengaging portion extending between the wedge members whereby as the handle member is rotated the disengaging portion engages one of the wedge members to move such wedge member out of wedging engagement with the exterior cylindrical surface of the base plate member whereby the locking member and thereby the shaft is rotated in the same direction as the handle member.

3. A self-locking positioning device according to claim 2 including:

means wherein the handle member positively engages the locking member subsequent to the engagement of the disengaging portion thereof with one of the wedge members.

4. A self-locking positioning device according to claim 2 wherein said handle member is readily removable.

5. A valve having self-locking positioning means, comprising, in combination:

a valve body having a fluid passage opening therethrough, the body having an integral boss portion extending therefrom and an axial opening through the boss portion intersecting the fluid passage;

a closure member rotatably supported in the valve body fluid passage for selectably opening and closing the fluid passage;

a base plate affixed to the body boss portion, the base plate having a cylindrical exterior surface and an axial opening therethrough aligning with the said axial opening in the boss portion;

a shaft rotatably supported in the said axial openings in said base plate and said body boss portion, said shaft affixed at one end to said closure member for rotatably positioning the closure member;

a locking member overlying the base plate and affixed to the shaft, at least a portion of the locking member lying adjacent to and exterior a portion of the base plate cylindrical exterior surface, this portion of the locking member having opposed wedge receiving openings therein;

a wedge member slidably positioned in each of the wedge receiving openings;

means biasing the wedge members into wedging engagement with the cylindrical exterior surface of the base plate; and a handle member rotatably supported about the shaft having a disengaging portion extending between the said wedge members whereby as the handle member is rotated the disengaging portion engages one of the wedge members to move such wedge member out of wedging engagement with the exterior cylindrical surface of the base plate member whereby the locking member and thereby the shaft and closure member are rotated in the same direction as the handle member.

6. A valve according to claim 5 including:
means whereby the handle member positively engages the locking member subsequent to the engagement of the disengaging portion thereof with one of the wedging members.

7. A valve according to claim 5 wherein said handle member is readily removable.

References Cited

UNITED STATES PATENTS

| | | | |
|---|---|---|---|
| 1,146,317 | 6/1915 | Favary | 192—8 |
| 2,633,213 | 3/1953 | Houplain | 192—8 |
| 2,664,015 | 12/1953 | Moore | 192—8 X |
| 2,973,070 | 2/1961 | Firth et al. | 192—8 |
| 3,198,477 | 8/1965 | Allenbaugh | 251—77 |

M. CARY NELSON, *Primary Examiner.*

R. C. MILLER, *Assistant Examiner.*